(12) United States Patent
Mueller

(10) Patent No.: US 6,220,581 B1
(45) Date of Patent: Apr. 24, 2001

(54) BICYCLE SEAT GAS SPRING ADJUSTMENT SYSTEM

(76) Inventor: Thomas L. Mueller, 6501 River Farm Dr., St. Louis, MO (US) 63129

( * ) Notice: Subject to any disclaimer, the term of this patent is extended or adjusted under 35 U.S.C. 154(b) by 725 days.

(21) Appl. No.: 08/539,840

(22) Filed: Oct. 6, 1995

(51) Int. Cl.[7] .................................................. B62J 1/04
(52) U.S. Cl. ............................................................ 267/64.11
(58) Field of Search ..................... 267/132; 297/64.11, 297/208, 209, 145.1, 215.13, 215.14; 280/283, 275, 220

(56) References Cited

U.S. PATENT DOCUMENTS

| | | | |
|---|---|---|---|
| 3,861,740 | * 1/1975 | Tajima et al. | 297/215.13 |
| 4,150,851 | * 4/1979 | Cienfuegos | 297/215.13 |
| 4,182,508 | * 1/1980 | Kallai et al. | 280/283 |
| 4,509,730 | * 4/1985 | Shtarkman | 267/35 |
| 4,789,176 | * 12/1988 | Carroll | 267/132 |
| 4,807,856 | * 2/1989 | Teckenbrock | 267/132 |
| 5,044,648 | * 9/1991 | Knapp | 280/283 |
| 5,094,424 | 3/1992 | Hartway . | |
| 5,236,170 | 8/1993 | Johnsen . | |
| 5,324,058 | * 6/1994 | Massaro | 280/283 |
| 5,324,174 | 6/1994 | Diotte . | |
| 5,344,170 | * 9/1994 | Ochoa | 280/283 |
| 5,352,016 | 10/1994 | Hobson . | |
| 5,382,039 | * 1/1995 | Hawker | 280/283 |
| 5,996,980 | * 12/1999 | Frey et al. | 267/64.27 |

* cited by examiner

*Primary Examiner*—Matthew C. Graham
(74) *Attorney, Agent, or Firm*—Kevin L. Klug

(57) ABSTRACT

A bicycle seat gas spring adjustment system removably inserted into a bicycle seat tube, between the bottom bracket and the seat post. The gas spring action providing a counteracting force to a portion of the rider's body weight by which the rider can adjust the height of the seating surface by changing the proportion of body weight placed onto the seating surface of the bicycle, thereby moving the seating surface to a desired position.

18 Claims, 3 Drawing Sheets

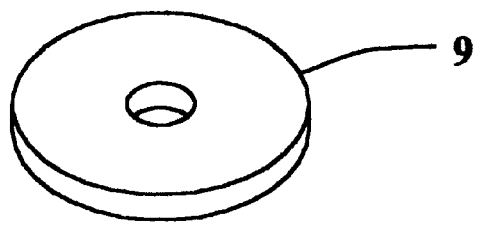
FIG. 3
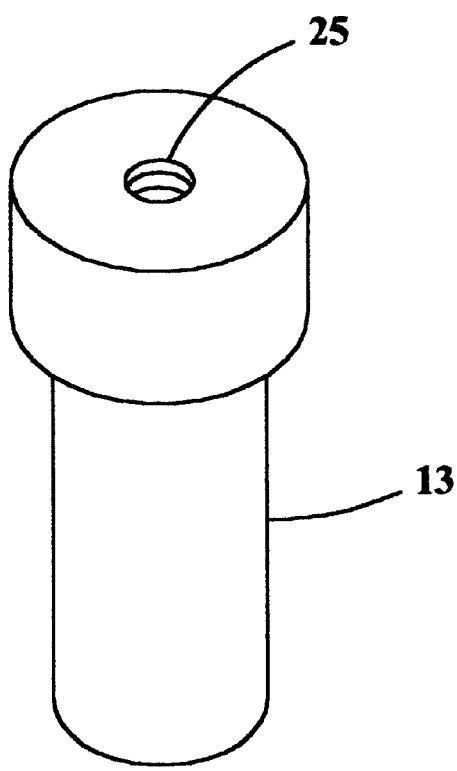
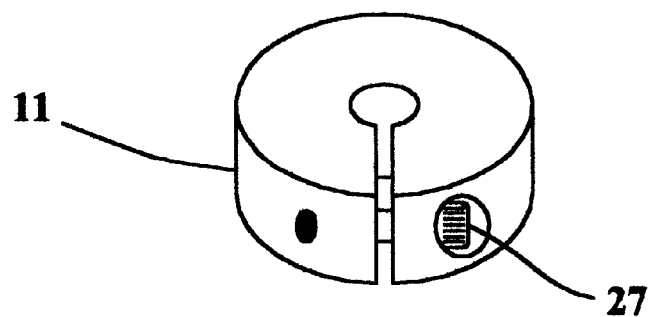
FIG. 4
FIG. 5

BICYCLE SEAT GAS SPRING ADJUSTMENT SYSTEM

BACKGROUND OF THE INVENTION

The present invention relates in general to bicycle seat adjustment devices and more particularly to gas spring adjustable bicycle seat height adjustment devices. The gas spring adjustment of this system is an improvement over existing bicycle seat adjustment devices.

Conventional methods of bicycle seat adjustment generally require the rider to stop, dismount, loosen a seat attachment bolt, manually raise or lower the bicycle seat, retighten the seat attachment bolt, remount and then begin riding again. The process is very time consuming and often requires many minutes of trial and error in order to achieve the correct height. Present seat adjustment mechanisms either prohibit adjustment while riding or limit it to the limited travel presented by a steel spring between the seat and frame.

Accordingly, it is an object of the present invention to provide an improved bicycle seat adjustment system that is adapted for quick adjustment of the height of a bicycle seat while riding yet allow that adjustment to be smooth and controlled.

Another object of the invention is to provide a bicycle seat adjustment system which does not alter its adjustment force versus distance of adjustment.

A further object of the invention is to provide a bicycle seat adjustment system which is easy to install on any conventional bicycle, whether small or large frame, with a minimum of specialized parts.

Still another object of the invention is to provide a bicycle seat adjustment system which is lightweight.

SUMMARY OF THE INVENTION

To accomplish the foregoing and other objects of this invention there is provided a bicycle seat gas spring adjustment system which utilizes a gas spring assembly in conjunction with an existing bicycle seat and conventional seat tube. The bicycle seat is comprised of a seating surface and conventional a seat post. Said conventional seat post inserts into the seat tube. The gas spring assembly is often comprised of an assembly with attached pushrod and an outer housing assembly. The gas spring assembly may be manufactured in a variety sizes, shapes, styles, and configurations which contain a variety of parts within an outer housing. The outer housing assembly is sized such that it fits within any conventional bicycle seat tube.

The gas spring assembly with its associated hardware is sized lengthwise via one or more gas spring spacers, which bear on a bicycle's bottom bracket within the seat tube, in order to match the length of the seat tube in which it is installed. The gas spring spacer(s) are often rigidly attached to said outer housing of said gas spring. If rigidly attached, the gas spring spacer(s) will also function to center the diameter of the gas spring within the seat tube. The objective of sizing the gas spring is to provide the maximum travel for the gas spring, i.e. no preload on the bicycle seat when it is adjusted to its maximum allowable height, and yet allow for secure bearing with the portion of the seat post which inserts into the seat tube.

A typical configuration will utilize one gas spring, one gas spring spacer, a seat post adaptor collar, a seat post adaptor washer and the existing seating surface conventional, seat post and seat tube on a bicycle. The objective of the seat post adaptor collar is to provide an adapting means by which the pushrod is allowed to securely bear upon the bottom of the conventional seat post. The seat post adaptor collar is movable on the portion of the gas spring upon which it is placed. It is held in place by via the friction between the seat post adaptor collar and the pushrod which is caused by a set screw which squeezes the collar firmly against the gas spring. Since the seat post adaptor collar is movable on the pushrod, the seat post adaptor collar allows for a modicum of adjustment to ensure that no preload is present on the seat when adjusted to its maximum height. That is, if the seat post quick release is opened fully, the seat post will not disengage from the seat tube.

The seat post adaptor collar may also be manufactured of two pieces whereby the collar firmly attaches to the push rod and one or more seat post adaptor washers, sized to the seat post diameter, are placed onto the pushrod and seated onto the collar. The seat post adaptor washer provides a method of adjustment and a means of adaptation for conventional seat posts of various diameters.

The gas spring may be of any force rating which is comfortable and convenient to the user, provided that the force is greater than the weight of the seating surface and conventional seat post. In a preferred embodiment, the gas spring force rating is 40 pounds.

The bicycle seat gas spring adjustment system may be manufactured out of a variety of different materials, and in different sizes, colors and shapes. In a preferred embodiment the pushrod, outer housing and seat post adaptor washer are manufactured of tempered steel and the adaptor collar is manufactured of aluminum alloy or steel.

BRIEF DESCRIPTION OF THE DRAWINGS

Numerous other objects, features and advantages of the invention should now become apparent upon a reading of the following detailed description taken in conjunction with the accompanying drawings, in which

FIG. 3 is a plan view of the seat post adaptor washer;

FIG. 4 is a plan view of the seat post adaptor collar;

FIG. 5 is a plan view of the gas spring spacer.

DETAILED DESCRIPTION

Figure 1:
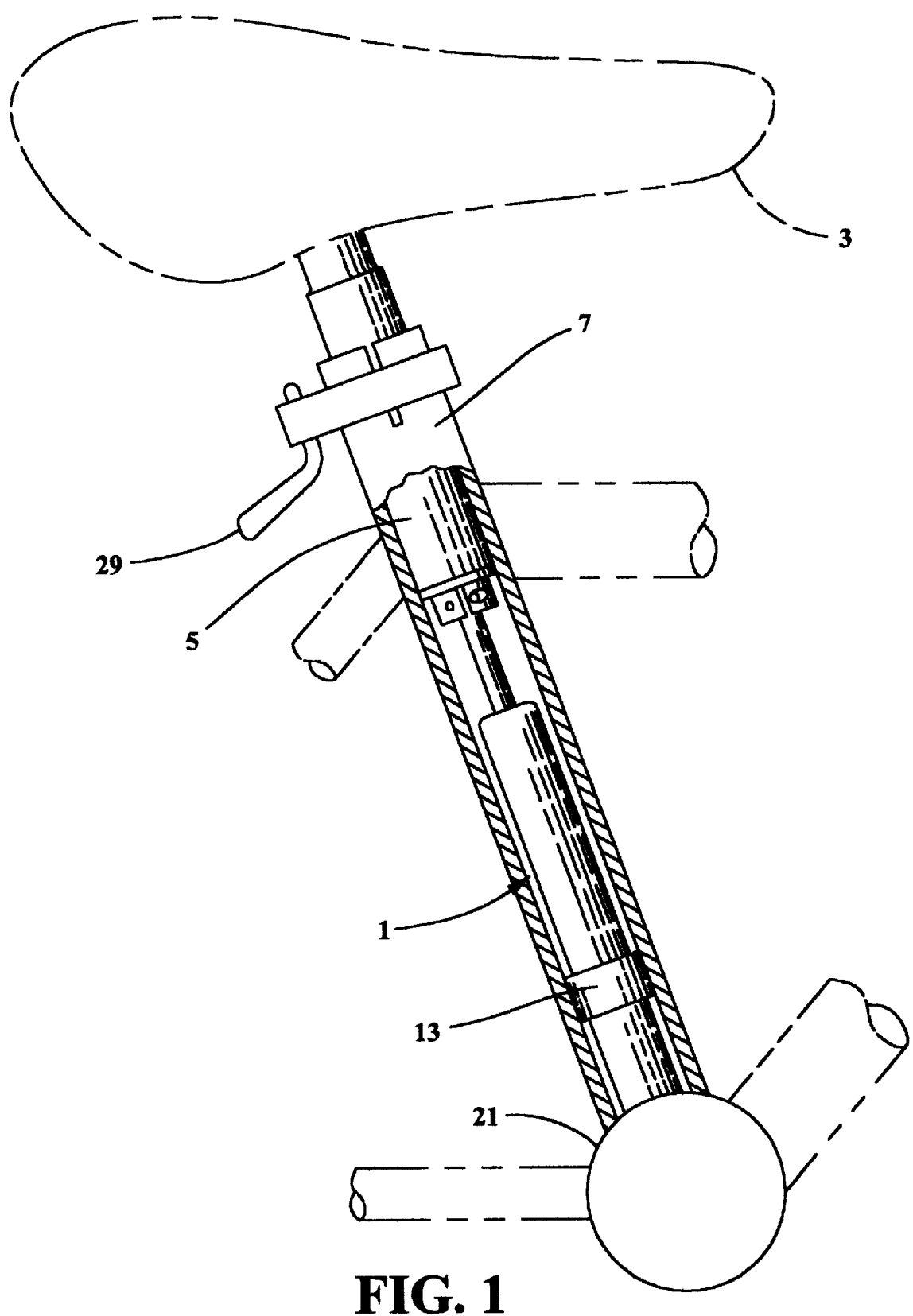
FIG. 1 is a perspective w of a preferred embodiment of the bicycle seat gas spring adjustment system, illustrated as placed within a bicycle seat tube.
Figure 2:
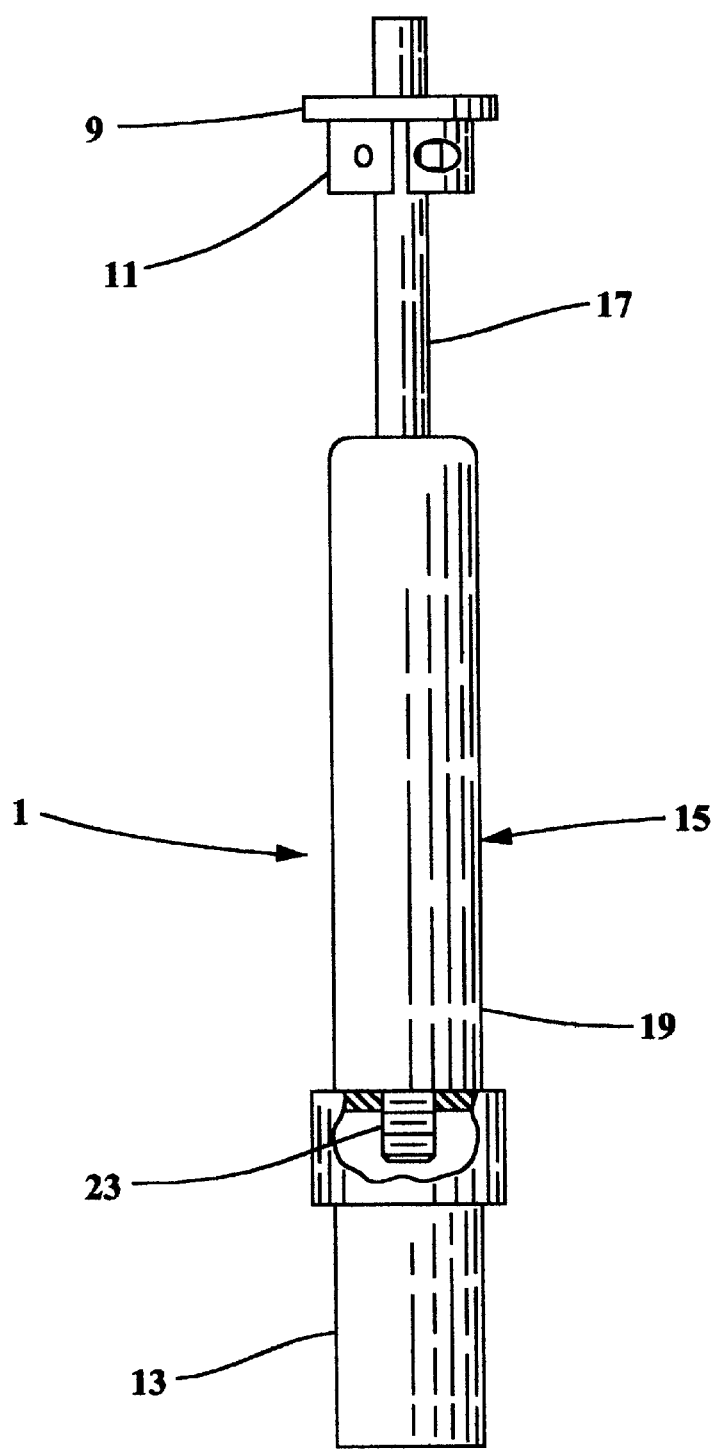
FIG. 2 is a plan view of the bicycle seat gas spring adjustment system, illustrated outside the seat tube housing.

Referring now to the drawings, there is shown a preferred embodiment in FIGS. 1–5 of the bicycle seat gas spring adjustment system. The bicycle seat gas spring adjustment system 1 is described in conjunction with a conventional bicycle seat post 5, seat tube 7 and bottom bracket 21 of the bicycle frame. The bicycle seat gas spring adjustment system is particularly adapted for quick and easy installation within a conventional bicycle or similar device. When properly installed, it provides a safe and easy to use method of seat adjustment while the rider is sitting on the bicycle or similar device, whether the bicycle or similar device is moving or stationary.

The drawings show the bicycle seat gas spring adjustment system 1 in conjunction with a seating surface 3, conventional seat post 5, seat tube 7, quick release 29, and bottom bracket 21. In the preferred embodiment, the bicycle seat gas spring adjustment system comprises a gas spring 15 having two halves, a first half comprising a pushrod 17 and a second half comprising an outer housing 19 containing a threaded end 23. The gas spring 15 rigidly attaches to a gas spring spacer 13 via the threaded end 23 engaging with the threaded hole 25 of the gas spring spacer 13. Furthermore, onto the pushrod 17 is placed a seat post adaptor collar 11 which frictionally binds to said pushrod 17 via the force of collar set screw 27. The seat post adaptor collar 11 contains a slit across which the set screw 27 is engaged and thereby compresses the seat post adaptor collar 27 onto the pushrod 17, thereby increasing the friction between the seat post adaptor collar 11 and the pushrod 17. Additionally, a seat post adaptor washer 9 is placed onto said pushrod 17 and seated onto the seat post adaptor collar 11 in order to provide the optimum fit and bearing surface between the seat post 5 and the pushrod 17. The seat post adaptor washer 9 may be of different diameters and thicknesses in order to bear effectively with the diameter of the seat post 5.

In a preferred embodiment, installation of the bicycle seat gas spring adjustment system 1 is as follows. The bicycle seating surface 3, conventional and the seat post 5 are removed by opening quick release 29. The bicycle seat gas spring adjustment system 1, including gas spring spacer 13, seat post adaptor collar 11, and seat post adaptor washer 9, all attached, is inserted into seat tube 7 until the gas spring spacer 13 bears upon the bottom bracket 21 of the bicycle. (The gas spring spacer 13 is sized for each manufacturers frame style such that maximum movement of the conventional seat post 5 is allowed.) conventional The seat post 5 is then inserted into the seat tube 7 until it bears upon the seat post adaptor washer 9. With zero force bearing upon the seat post adaptor washer 9 and the quick release 29 opened, the conventional seat post 5 should achieve its maximum safe extension away from the seat tube 7 as recommended by the bicycle manufacturer. Should the zero force bearing of the conventional seat post 5 upon the seat post adaptor washer 9 not conform to the bicycle manufacturers maximum allowed extension of the conventional seat post 5 from the seat tube 7, the user must remove the bicycle seat gas spring adjustment system 1 and reposition the seat post adaptor collar 11 and seat post adaptor washer 9 on the pushrod 17 as is necessary to meet the bicycle manufacturers requirements. After proper extension is achieved, the conventional seat post 5 containing the seating surface 3 is inserted into the seat tube 7 and when the conventional seat post 5 is positioned to its desired location, the quick release 29 is turned such the conventional seat post 5 is frictionally held by the seat tube 7 due to the seat tube 7 constriction by quick release 29.

In operation, a rider mounts the bicycle containing the bicycle seat gas spring adjustment system 1 and places a substantial amount of the rider's body weight onto the seating surface 3. The body weight is moderated by the rider's feet contacting the ground and supplying the countervailing force necessary to limit the proportion of the body weight supported by the seating surface 3. The rider then loosens the quick release 29 and allows the substantial body weight on the seating surface 3 to push the conventional seat post 5 further into the seat tube 7 against the force of gas spring 15. The amount of movement of the conventional seat post 5 is controlled by the rider's legs pushing upon the ground. Upon attainment of a comfortable and proper seating surface 3 and conventional seat post 5 insertion height, the rider tightens the quick release 29, thereby securing the conventional seat post 5 with the seat tube 7, and begins use of the bicycle or related device upon which the seat is mounted. This process is repeatable whether the rider is stationary or moving. That is, while moving the rider may place more or less body weight on the seating surface 3 and control the movement of the conventional seat post 5 by placing the rider's feet on the bicycle pedals and using them as standing support instead of the ground. The result is that when properly adjusted, the bicycle seat gas spring adjustment system 1 provides a constant and smooth adjustment force over the entire range of motion of the bicycle seating surface 3 and seat conventional post 5 which cannot be achieved with a conventional spring based system.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A bicycle seat gas spring adjustment system inserted into a seat tube and operated in conjunction with a conventional seat post and a bottom bracket comprising:
   a gas spring capable of providing a substantially constant force throughout its range of motion, said gas spring having a first half and a second half and a first end and a second end, said first end located on said first half and said second end located on said second half, said first half substantially bearing with said conventional seat post and said second end substantially bearing upon said bottom bracket, thereby providing a substantially constant force upon said conventional seat post throughout its range of motion.

2. A bicycle seat gas spring adjustment system as described in claim 1, further comprising one or more gas spring spacers inserted between said second end of said gas spring and said bottom bracket.

3. A bicycle seat gas spring adjustment system as described in claim 1, further comprising a seat post adaptor collar, securely attached to said first half of said gas spring, said seat post adaptor collar forming a bearing surface with said conventional seat post, whereby said seat post adaptor collar causes said first half of said gas spring to substantially bear with said conventional seat post.

4. A bicycle seat gas spring adjustment system as described in claim 3, further comprising one or more set screws attached to said seat post adaptor collar, whereby said one or more set screws ensure that said seat post adaptor collar is securely attached to said first half of said gas spring.

5. A bicycle seat gas spring adjustment system as described in claim 3, further comprising a seat post adaptor washer inserted between said seat post adaptor collar and said conventional seat post whereby said seat post adaptor washer forms a bearing surface between said conventional seat post and said seat post adaptor collar.

6. A bicycle seat gas spring adjustment system as described in claim 2, wherein said second end is rigidly attached to said one or more gas spring spacers.

7. A bicycle seat gas spring adjustment system as described in claim 6, wherein said second end of said gas spring is rigidly attached to said one or more gas spring spacers with a threaded end attached to said second end of said gas spring.

8. A bicycle seat gas spring adjustment system as described in claim 5, further comprising one or more gas spring spacers inserted between said second end of said gas spring and said bottom bracket.

9. A bicycle seat gas spring adjustment system as described in claim 8, wherein said second end of said gas spring is rigidly attached to said one or more gas spring spacers with a threaded end attached to said second end of said gas spring.

10. A bicycle seat gas spring adjustment system as described in claim 9, further comprising one or more set screws attached to said seat post adaptor collar, whereby said one or more set screws ensure that said seat post adaptor collar is securely attached to said first half of said gas spring.

11. A method for adjustment of a seat on a bicycle or similar device, said bicycle or similar device containing, a seating surface, a conventional seat post, a seat tube, and a bottom bracket, the steps comprising:

inserting a gas spring, having a first half and a second half, which provides a substantially constant force throughout its range of motion into said seat tube until said second half of said gas spring substantially bears upon said bottom bracket;

inserting said conventional seat post into said seat tube until said conventional seat post substantially bears upon said first half of said gas spring;

placing a necessary amount of substantially constant force onto said conventional seat post in order to cause said conventional seat post to move to a desirable position.

12. A method for adjustment of a seat on a bicycle or similar device as set forth in claim 11, the steps further comprising:

securely attaching a seat post adaptor collar onto said first half of said gas spring, thereby causing said conventional seat post to bear upon said seat post adaptor collar.

13. A method for adjustment of a seat on a bicycle or similar device as set forth in claim 11, the steps further comprising:

inserting one or more gas spring spacers between said second half of said gas spring and said bottom bracket, thereby providing optimum positioning adjustment of the gas spring.

14. A method for adjustment of a seat on a bicycle or similar device as set forth in claim 12, the steps further comprising:

inserting a seat post adaptor washer between said seat post adaptor collar and said conventional seat post to provide an optimum bearing surface.

15. A method for adjustment of a seat on a bicycle or similar device as set forth in claim 13, the steps further comprising:

securely attaching a seat post adaptor collar onto said first half of said gas spring, thereby causing said conventional seat post to bear upon said seat post adaptor collar.

16. A method for adjustment of a seat on a bicycle or similar device as set forth in claim 15, the steps further comprising:

inserting a seat post adaptor washer between said seat post adaptor collar and said conventional seat post, thereby providing an optimum bearing surface.

17. A method for adjustment of a seat on a bicycle or similar device as set forth in claim 11, the steps further comprising:

placing a substantial portion of the user's body weight onto said seating surface in order to provide the necessary amount of force to said conventional seat post.

18. A method for adjustment of a seat on a bicycle or similar device as set forth in claim 16, the steps further comprising:

placing a substantial portion of the user's body weight onto said seating surface in order to provide the necessary amount of force to said conventional seat post.

* * * * *